US006947816B2

(12) United States Patent
Chen

(10) Patent No.: US 6,947,816 B2
(45) Date of Patent: Sep. 20, 2005

(54) METHOD AND SYSTEM FOR COMPUTER NETWORK IMPLEMENTED VEHICLE DIAGNOSTICS

(75) Inventor: Ieon C. Chen, Laguna Hills, CA (US)

(73) Assignee: Innova Electronics Corporation, Fountain Valley, CA (US)

( * ) Notice: Subject to any disclaimer, the term of this patent is extended or adjusted under 35 U.S.C. 154(b) by 15 days.

(21) Appl. No.: 11/028,111

(22) Filed: Jan. 3, 2005

(65) Prior Publication Data

US 2005/0119809 A1 Jun. 2, 2005

Related U.S. Application Data

(63) Continuation of application No. 09/961,223, filed on Sep. 21, 2001.

(51) Int. Cl.[7] .............................................. G06F 19/00

(52) U.S. Cl. ........................... 701/33; 701/29; 701/32; 701/35; 324/500; 702/183

(58) Field of Search ............................. 701/33, 29, 30, 701/31, 32, 35; 324/72, 72.5, 67, 500, 503; 455/423; 702/183, 184

(56) References Cited

U.S. PATENT DOCUMENTS

| | | | |
|---|---|---|---|
| 2,960,654 | A | 11/1960 | Nelson |
| 3,646,438 | A | 2/1972 | Staff |
| 4,176,315 | A | 11/1979 | Sunnarborg |
| 4,207,611 | A | 6/1980 | Gordon |
| 4,404,639 | A | 9/1983 | McGuire et al. |
| 4,859,932 | A | 8/1989 | Whitley |
| 4,884,033 | A | 11/1989 | McConchie Sr. |
| 5,003,478 | A | 3/1991 | Kobayashi et al. |
| 5,005,129 | A | 4/1991 | Abe et al. |
| 5,107,428 | A | 4/1992 | Bethencourt et al. |
| 5,157,708 | A | 10/1992 | Garthwaite et al. |
| 5,214,582 | A | 5/1993 | Gray |
| 5,247,245 | A | 9/1993 | Nelson |
| 5,278,508 | A | 1/1994 | Bowman |
| 5,285,163 | A | 2/1994 | Liotta |
| 5,359,290 | A | 10/1994 | Cervas |
| 5,394,093 | A | 2/1995 | Cervas |
| 5,400,018 | A | 3/1995 | Scholl et al. |
| 5,481,906 | A | 1/1996 | Nagayoshi et al. |
| 5,491,418 | A | 2/1996 | Alfaro et al. |

(Continued)

OTHER PUBLICATIONS

Sunpro Sensor Testers Product Comparison, 1995 (4 pages).

(Continued)

*Primary Examiner*—Tan Q. Nguyen
(74) *Attorney, Agent, or Firm*—Stetina Brunda Garred & Brucker

(57) ABSTRACT

A method of diagnosing a status of a vehicle. The vehicle has an on-board computer for generating a diagnostic trouble code signal related to a passed or problem status of the vehicle. A portable code reader is connected to the on-board computer. Diagnostic trouble code signals are communicated from the on-board computer to the code reader. The code reader communicates to a personal computer respective ones of the diagnostic trouble code signals related to a problem status of the vehicle. The personal computer communicates the respective ones of the diagnostic trouble code signals from the personal computer to a remote computer. The remote computer is configured to correlate the diagnostic trouble code signals to problem description data for diagnosing the vehicle. Problem description data correlated to the respective ones of the diagnostic trouble code signals are communicated from the remote computer to the personal computer.

11 Claims, 6 Drawing Sheets

U.S. PATENT DOCUMENTS

| | | | |
|---|---|---|---|
| 5,506,772 | A | 4/1996 | Kobozono et al. |
| 5,541,840 | A | 7/1996 | Gurne et al. |
| 5,657,233 | A | 8/1997 | Cherrington et al. |
| 5,758,300 | A | 5/1998 | Abe |
| 5,916,286 | A | 6/1999 | Seashore et al. |
| 6,225,898 | B1 | 5/2001 | Kamiya et al. |
| 6,263,265 | B1 | 7/2001 | Fera |
| 6,263,322 | B1 | 7/2001 | Kirkvold et al. |
| 6,295,492 | B1 | 9/2001 | Lang et al. |
| 6,330,499 | B1 | 12/2001 | Chou et al. |
| 6,535,802 | B1 | 3/2003 | Kramer |
| 6,687,584 | B2 | 2/2004 | Andreasen |
| 2001/0053983 | A1 | 12/2001 | Reichwein et al. |
| 2002/0156692 | A1 | 10/2002 | Squeglia et al. |
| 2002/0193925 | A1 | 12/2002 | Funkhouser et al. |
| 2003/0060953 | A1 | 3/2003 | Chen |

OTHER PUBLICATIONS

Sunpro Sensor Tester Plus, undated (1 page).

OTC's Latest Innovations, 1989 (6 pages).

OTC Diagnostic Testers and Tools for the Professional, undated (20 pages).

OTC System 2000 Diagnostic Testers and Tools, undated (24 pages).

EPA Performing Onboard Diagnostic System Checks as Part of a Vehicle Inspection and Maintenance Program, Jun. 2001 (25 pages).

Equus Products, Inc. Catalog, 1998 (32 pages).

Equus Products, Inc. Catalog, Automotive Testers, Gauge and Tachometers and Cruise Control, 1995 (28 pages).

Sunpro Catalog by Actron, Nov. 1996 (20 pages).

Innova Electronics Corporation Brochure, 3100 OBD II Code Reader, 2001.

Equus Products, Inc. Manual-ECM Code Reader, Model 3007, 1993 (18 pages).

Equus Products, Inc. Manual-ECM Code Reader, Model 3008, 1993 (5 pages).

METHOD AND SYSTEM FOR COMPUTER NETWORK IMPLEMENTED VEHICLE DIAGNOSTICS

CROSS-REFERENCE TO RELATED APPLICATIONS

This is a continuation of application Ser. No. 09/961,223 filed Sep. 21, 2001.

STATEMENT RE: FEDERALLY SPONSORED RESEARCH/DEVELOPMENT (Not Applicable)

BACKGROUND OF THE INVENTION

The present invention relates generally to methods and systems of diagnosing a vehicle, and more particularly to a method and system which contemplates establishing an electronic communications link with a remote computer for correlation of diagnostic fault codes.

Modern motor vehicles include a computer control system. The main purpose of the vehicle's computer control system is to provide maximum engine performance with the least amount of air pollution and the best fuel efficiency possible. The computer control system consists of the on-board computer and several related electronic control devices (sensors, switches, and actuators). The control devices may control various systems and/or subsystems within the vehicle. These electronic control devices send information to the on-board computer about such parameters as the temperature and density of the outside air, the speed of the engine, the amount of fuel delivered, etc. At the same time, the on-board computer scans for any problems from its sensors. If a problem is detected, the on-board computer stores the problem as a numeric code, referred to as a diagnostic trouble code or fault code, in its memory for later retrieval. In this regard, diagnostic trouble codes (DTCs) are codes that identify a particular problem area and are intended as a guide to the proper corrective servicing of the vehicle.

In response to governmental regulations and industry practices, vehicle manufactures have begun to standardize diagnostic trouble codes. For example, the current generation standard or communications protocol is referred to as OBD II. Beginning in 1996, all vehicles built for sale in the U.S. were required to be OBD II-compliant.

Hand-held or portable code reader, also referred to as a diagnostic code readers or scan tools, have been utilized to trouble shoot faults or problems associated with these electronic control units. Such code readers are configured to electronically communicate with a vehicle's on-board computer for accessing stored diagnostic trouble codes. The more sophisticated code readers may be configured to determine a particular standard or communications protocol being implemented by the subject vehicle. The code reader interfaces with the vehicle's on-board computer via a connection point which is usually located under the instrument panel (dash), on the drivers side of most vehicles. OBD II-compliant vehicles are configured to have a on-board computer equipped to receive a sixteen-pin data link connector cable from the code reader.

The code reader typically has a display for indicating received diagnostic trouble codes. Some code readers include problem description data correlated to the diagnostic trouble codes stored in memory. Other code readers are used in connection with a booklet containing problem description data correlated to the diagnostic trouble codes. Over time, due to newer model vehicles and availability of additional diagnostic trouble codes, it is contemplated that the problem description data (either as stored in the code reader memory or related booklet) would require updating.

From the perspective of vehicle owners, personal use of code readers may be advantageous. Vehicle owners may choose to effect a repair themselves, possibly at a substantial cost savings in comparison to having service providers or technicians perform the same repairs. Alternatively, even if the services of a service technician are utilized, with the advance knowledge as to the nature and scope of vehicle problem, a vehicle owner may be able to mitigate unwarranted services and costs. Moreover, a vehicle owner may avoid a service fee to the service technician for performing the very same task of retrieving the diagnostic trouble codes and correlating them to the problem description data.

From the perspectives of a manufacturer of replacement automobile parts, a manufacturer of tools used in connection with replacement or repair of automobile parts, and a retailer of such parts or tools, the use and availability of code readers to vehicle owners is encouraged. In this respect, vehicle owners may be able to diagnose vehicle problems which may lead to such vehicle owners who are weekend mechanics effecting repairs themselves, or purchasing replacement parts and/or related tools for a service technician to effect the related repair.

The network of computers that is what is currently understood as the Internet has allowed for the proliferation and easy access to vast amounts of data and information. In addition, the "electronic shopping" offered by businesses having an Internet presence is increasingly being viewed as a desirable alternative to the more traditional forms of shopping which typically necessitates a trip to a retail outlet or service provider. Those who shop online are often referred to as engaging in "e-commerce". In this regard, an online retailer would typically maintain an e-commerce enabled web site on what is currently understood as the Internet. Such a web site would typically include an online catalog of goods or services advertised for sale. It is contemplated that such a web site would be configured to facilitate online transactions for such goods or services (e.g., able to receive orders, process payment by processing credit card debits, etc.).

From the perspective of a vehicle owner desiring to utilize a code reader to perform vehicle diagnostics, and from the perspective of a manufacturer of replacement automobile parts, a manufacturer of tools used in connection with replacement or repair of automobile parts, and a retailer of such parts or tools, it is therefore evident that there exists a need in the art for a more efficient use of code readers for diagnosing a vehicle in comparison to the prior art methods.

BRIEF SUMMARY OF THE INVENTION

In accordance with an aspect of the present invention, there is provided a method of diagnosing a vehicle via a remote computer. The vehicle has an on-board computer for generating a diagnostic trouble code signal. The diagnostic trouble code signal is related to a passed status of the vehicle or a problem status of the vehicle. The method begins with the initial step of connecting a portable code reader to the on-board computer. Diagnostic trouble code signals are communicated from the on-board computer to the code reader. Respective ones of the diagnostic trouble code signals related to a problem status of the vehicle are communicated from the code reader to a personal computer. The respective ones of the diagnostic trouble code signals are communicated to a remote computer from the personal computer. The remote computer is configured to correlate the diagnostic trouble code signals to problem description data for diagnosing the vehicle. Problem description data correlated to the respective ones of the diagnostic trouble code signals is communicated from the remote computer to the personal computer.

In an embodiment of the present invention, the method further provides for product/service provider information related to the problem description data being communicated from the remote computer to the personal computer. In addition, a cable connection may be utilized for connecting the on-board computer to the code reader. A computer network may be used to communicate between the personal computer and the remote computer. The computer network may be the Internet and the remote computer may be associated with a web site.

According to another aspect of the present invention, there is provided a method of diagnosing a status of a vehicle. The vehicle has an on-board computer for generating diagnostic trouble code signals. The diagnostic trouble code signals are related to a problem status of the vehicle. The personal computer has diagnostic trouble codes stored therein retrieved from the on-board computer of the vehicle. The diagnostic trouble code signal is received by a remote computer from the personal computer. The diagnostic trouble code signal is correlated to problem description data for diagnosing the vehicle. The problem description data communicated to the personal computer.

The personal computer may be provided with access to product/service provider information related to the problem description data. A vehicle owner/provider electronic communications link may be facilitated between the personal computer and a product/service provider computer. In addition, the electronic communications link may be established via the Internet and the product/service provider computer may be associated with a web page. A number of times the vehicle owner/provider electronic communications link is established may be tracked. A database may be hosted having problem description data for diagnosing the vehicle indexed to diagnostic trouble codes.

According to another aspect of the present invention, there is provided a vehicle diagnosis system for diagnosing a status of a vehicle. The vehicle has an on-board computer for generating diagnostic trouble code signals. The diagnostic trouble code signals are related to a passed status of the vehicle or a problem status of the vehicle. The vehicle diagnosis system includes a portable code reader configured to electronically communicate with the on-board computer for receiving diagnostic trouble code signals from the on-board computer. The code reader has an output device for indicating a status of the vehicle in response to receipt of the diagnostic trouble code signals from the on-board computer. The vehicle diagnosis system includes a personal computer configured to electronically communicate with the code reader for receiving from the code reader diagnostic trouble code signals related to a problem status of the vehicle. The personal computer has a remote electronic communications interface. The remote electronic communications interface is configured to establish an electronic communications link between the personal computer and a remote computer for transmitting the diagnostic trouble code signals to the remote computer.

According to an embodiment of the present invention, the output device is preferably configured to visually indicate a status of the vehicle in response to receipt of the diagnostic trouble code signals from the on-board computer. The output device may be configured to visually indicate a status of the vehicle with a color indicator. The code reader is configured to indicate a failure to receive a diagnostic trouble code signal. The output device is configured to indicate an inconclusive status of the vehicle in response to a failure to receive diagnostic trouble code signals from the on-board computer. The code reader further comprises a cable connector interface for electronically communicating with the on-board computer using the code reader. The electronic communications link is establishable via a computer network. The computer network is the Internet and the remote computer is associated with a web site. The code reader and the personal computer may be the same device.

According to yet another aspect of the present invention, there is provided a portable code reader for diagnosing a status of a vehicle. The vehicle has an on-board computer for generating diagnostic trouble code signals. The diagnostic trouble code signals are related to a passed status of the vehicle or a problem status of the vehicle. The code reader includes an on-board computer connection interface configured to electronically communicate with the on-board computer for receiving diagnostic trouble code signals from the on-board computer. The code reader further includes an output device configured to indicate a passed or a problem status of the vehicle in response to receipt of the diagnostic trouble code signal from the on-board computer and an inconclusive status of the vehicle in response to a failure to receive diagnostic trouble code signals from the on-board computer. The code reader further includes a code reader memory configured to store diagnostic trouble code signals received from the on-board computer connection interface related to a problem status of the vehicle. The code reader further includes a personal computer connection interface configured to electronically communicate with a personal computer for transmitting diagnostic trouble code signals indicative of a problem status stored in the code reader memory for diagnosing the vehicle. Preferably, the output device is configured to visually indicate a status of the vehicle. The output device may be configured to visually indicate a status of the vehicle with a color indicator. The on-board computer connection interface may be a cable connector interface.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
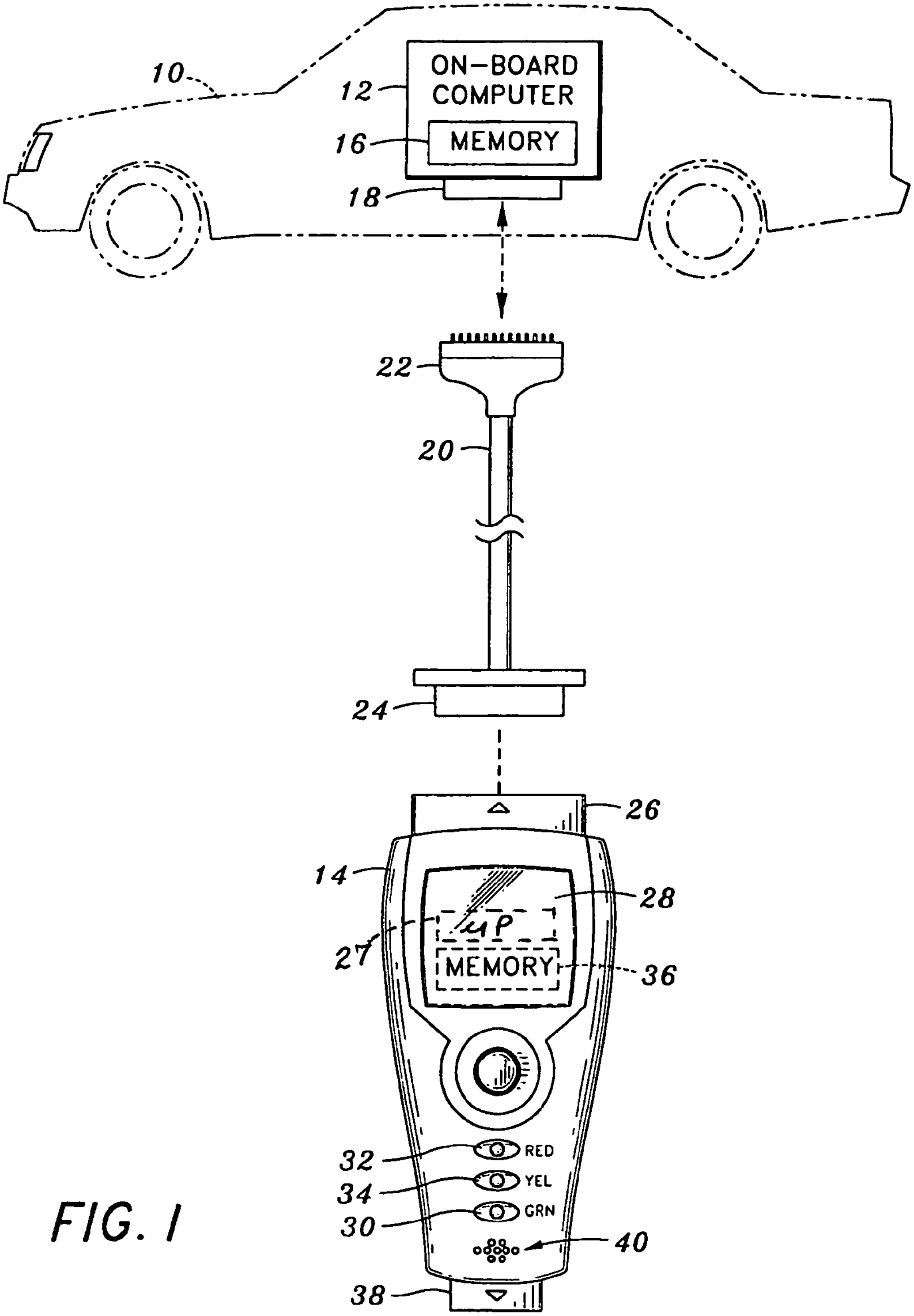
FIG. 1 is a symbolic relational diagram depicting a code reader for use in diagnosing a vehicle according to an aspect of the present invention.

Referring now to the drawings wherein the showings are for purposes of illustrating a preferred embodiment of the present invention only, and not for purposes of limiting the same, FIGS. 1–7 illustrate methods and systems of diagnosing a vehicle 10 according to aspects of the present invention.

Referring now to FIG. 1 there is depicted the vehicle 10. The vehicle has an on-board computer 12. As will be discussed in detail below, the on-board computer 12 is configured to generate diagnostic trouble code signals for access by a code reader 14.

The on-board computer 12 includes a memory 16 The on-board computer 12 is contemplated to be a portion of a computer control system of the vehicle 10. In this regard, the computer control system further includes several related electronic control devices (sensors, switches, and actuators). The control devices may control various systems and/or subsystems within the vehicle 10. These electronic control devices send information to the on-board computer 12 about such parameters as the temperature and density of the outside air, the speed of the engine, the amount of fuel delivered, etc. At the same time, the on-board computer 12 scans for any problems from its sensors. If a problem is detected, the on-board computer 12 stores the problem as a numeric code, referred to as a diagnostic trouble code or fault code, in its memory 16 or later retrieval by the code reader 14. In this context, the on-board computer 12 generates diagnostic trouble code signals which are representative of the stored diagnostic trouble codes with respect to the code reader 14.

The diagnostic trouble code signals are related to a passed status of the vehicle 10 or a problem status of the vehicle 10. In this regard, the specific value or sequences of values of a given diagnostic trouble code signal may indicate that no diagnostic trouble codes were received and recorded in the memory 16 of the on-board computer 12 thereby being representative of a passed status of the vehicle. Alternatively, the specific value or sequences of values of a given diagnostic trouble code signal may indicate one or more specific faults such as indicated by sensors in the vehicle 10 thereby representative of a problem status of the vehicle 10.

The code reader 14 includes an on-board computer connection interface 18 configured to electronically communicate with the on-board computer 12 for receiving diagnostic trouble code signals from the on-board computer 12. In the embodiment shown, the on-board computer connection interface 18 is configured to connect with a cable 20 via a cable connector 22. It is contemplated that the on-board computer connection interface 18 may take others forms or configurations, such as a wireless connection. As shown, the cable 20 further includes another cable connector 24 and the code reader 14 includes a code reader connection interface 26 sized and configured to receive the cable connector 24.

It is contemplated that the code reader 14 includes a microprocessor 27 for determining whether the received diagnostic trouble code signal is indicative of either a passed or problem status of the vehicle 10. Further, the microprocessor 27 may further determine whether any diagnostic trouble codes have be properly received from the on-board computer 12. As such, the microprocessor is configured to detect the failure of receipt of a diagnostic trouble code signal from the vehicle 10. It is contemplated that the failure to receive a diagnostic trouble code signal from the on-board computer 12 is indicative of an inconclusive status of the vehicle 10. Such inconclusive status of the vehicle 10 represents that a particular usage of the code reader 14 failed to affirmatively determine either a passed or problem status of the vehicle 10.

The code reader 14 further includes an output device 28 configured to indicate a passed or a problem status of the vehicle in response to receipt of the diagnostic trouble code signal from the on-board computer 12. The output device 28 is further configured to indicate an inconclusive status of the vehicle in response to a failure to receive a diagnostic trouble code signal from the on-board computer 12. The output device 28 may take various forms, such as a panel display as shown. The panel display may visually indicate the status of the vehicle 10. In addition, in another form, the code reader 14 may include indicator lights 30, 32, 34 to visually indicate the status of the vehicle. Such indicator lights 20, 32, 34 may be color coded with indicator light 30 being green to correspond to a passed status of the vehicle 10, indicator light 32 being red to correspond to a problem status of the vehicle 10, and indicator light 34 being yellow to correspond to an inconclusive status of the vehicle 10. In addition, the indicator lights 30, 32, 34 may be configured to flash. The code reader 14 may further includes a speaker 40 for audible indications of the status of the vehicle 10 are further contemplated.

The code reader 14 further includes a code reader memory 36 configured to store diagnostic trouble code signals received from the on-board computer connection interface 18 related to a problem status of the vehicle 10.

Figure 2:
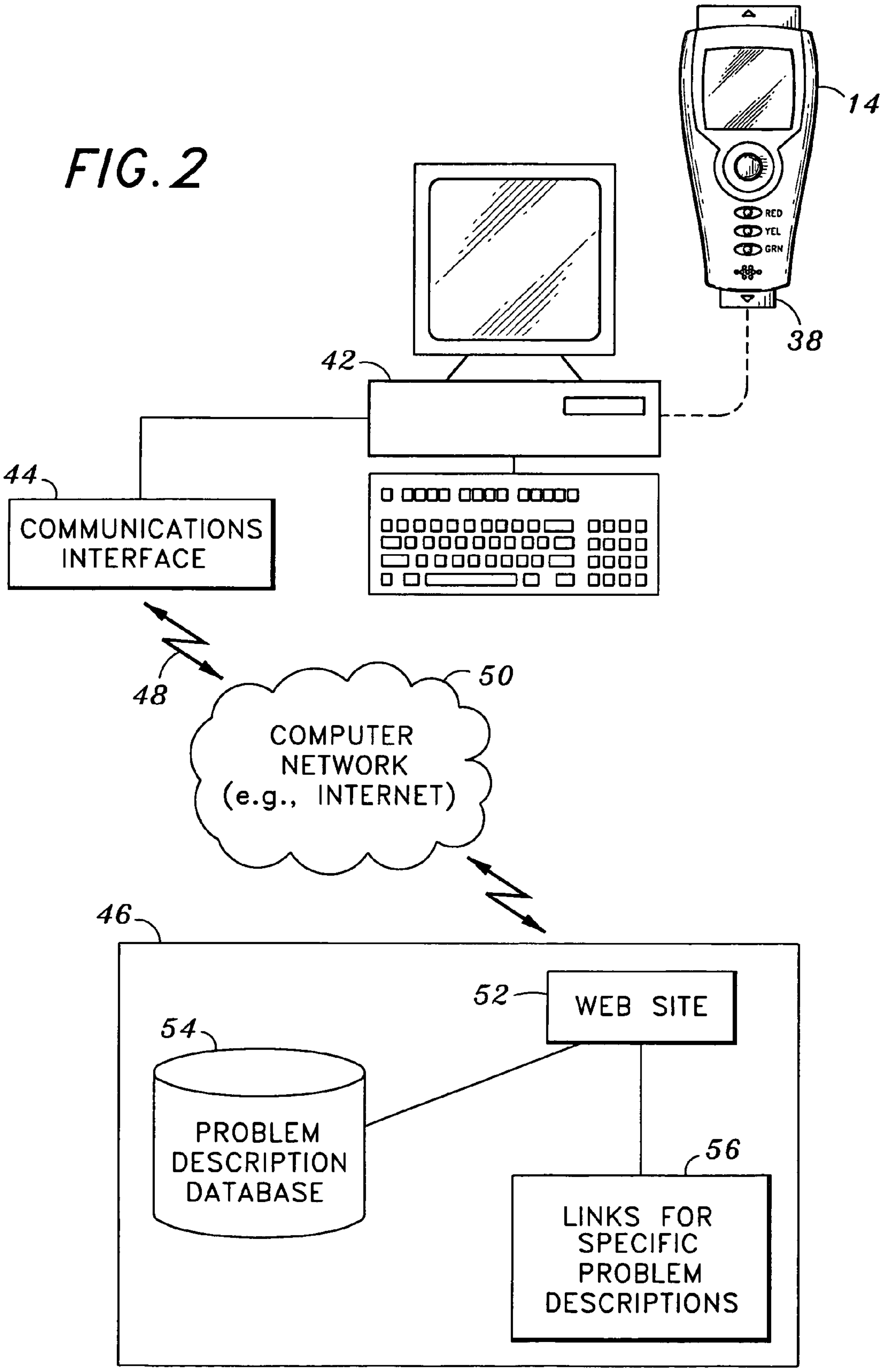
FIG. 2 is a symbolic relational diagram depicting the code reader as used in connection with a personal computer and a remote computer according to another aspect of the present invention.

Referring additionally to FIG. 2, the code reader 14 further includes a personal computer connection interface 38 configured to electronically communicate with a personal computer 42. The personal computer 42 is configured to electronically communicate with the code reader 14 for receiving from the code reader 14 a respective ones of the diagnostic trouble code signals which are related to a problem status of the vehicle 10. It is understood the diagnostic trouble code signals passed from the code reader 14 to the personal computer 42 may be representative or derivative of the diagnostic trouble code signals received by the code reader 14 itself. Further, as used herein, the terms personal computer and computer are used interchangeably, and include any of those computing devices which are well known to one of ordinary skill in the art, including any device used to automatically apply logic. For example, such computing devices may include computers of all kinds such as personal computer, desktop computers, laptop computers, terminals, hand-held palm devices, personal digital assistants (PDAs), servers, portable telephones, etc. In an embodiment of the present invention, it is contemplated that the code reader 14 and the personal computer 42 are the same device.

The personal computer has a remote electronic communications interface 44 which for transmitting the received diagnostic trouble code signals to a remote computer 46. In this regard, the remote electronic communications interface 44 is configured to establish an electronic communications link 48 between the personal computer 42 and a remote computer 46 for transmitting the diagnostic trouble code signals to the remote computer 46. It is understood the diagnostic trouble code signals passed from the personal computer 42 to the remote computer 46 may be representative or derivative of the diagnostic trouble code signals received by the personal computer 42 from code reader 14.

The electronic communications link 48 may be established a computer network 50. The electronic communications link 48 may be effectuated via any of those methods which are well known to one of ordinary skill in the art which may utilize telephone, cable (Digital Subscriber Lines (DSL) and variations thereof, wire, optical, etc.), optical communications (including infrared), and wireless forms of communications, such as those based upon cellular, satellite, and radio frequency (RF), and other forms of electromagnetic wave based mediums. While the computer network 50 may be what is currently understood as the Internet, any other computer communication and/or network arrangements may also be utilized, such as local area networks (LANs), intranets, extranets, wide area networks (WANs), private networks, virtual private networks, dedicated circuits, integrated services digital networks (ISDNs), frame relay, etc. Thus, in the case where the computer network 50 is the Internet, the remote computer 46 may be hosted at a web address. As such the remote computer 46 may be associated with a web site 52.

Importantly, the remote computer 46 facilitates access to problem description data which may be correlated to the diagnostic trouble code signals received from the personal computer 42. In this regard, the remote computer 46 may include or at least is configured to access a problem description database 54. The problem description database 54 includes problem description data correlated to the diagnostic trouble code signal. In this regard, the problem description database 54 may include a look-up table of various possible diagnostic trouble codes and the associated problem descriptions for each such diagnostic trouble code. Upon receipt of the diagnostic trouble code signal, the remote computer 42 is configured to correlate the related diagnostic trouble code to the appropriate problem description data and transmit back to the personal computer 42 such problem description data. In addition, as described in further detail below, the problem description database 54 may include cross-references to product/service provider information related to the problem description data, the remote computer 46 may include electronic links 56 related to the problem description data and the product/service provider information.

Figure 3:
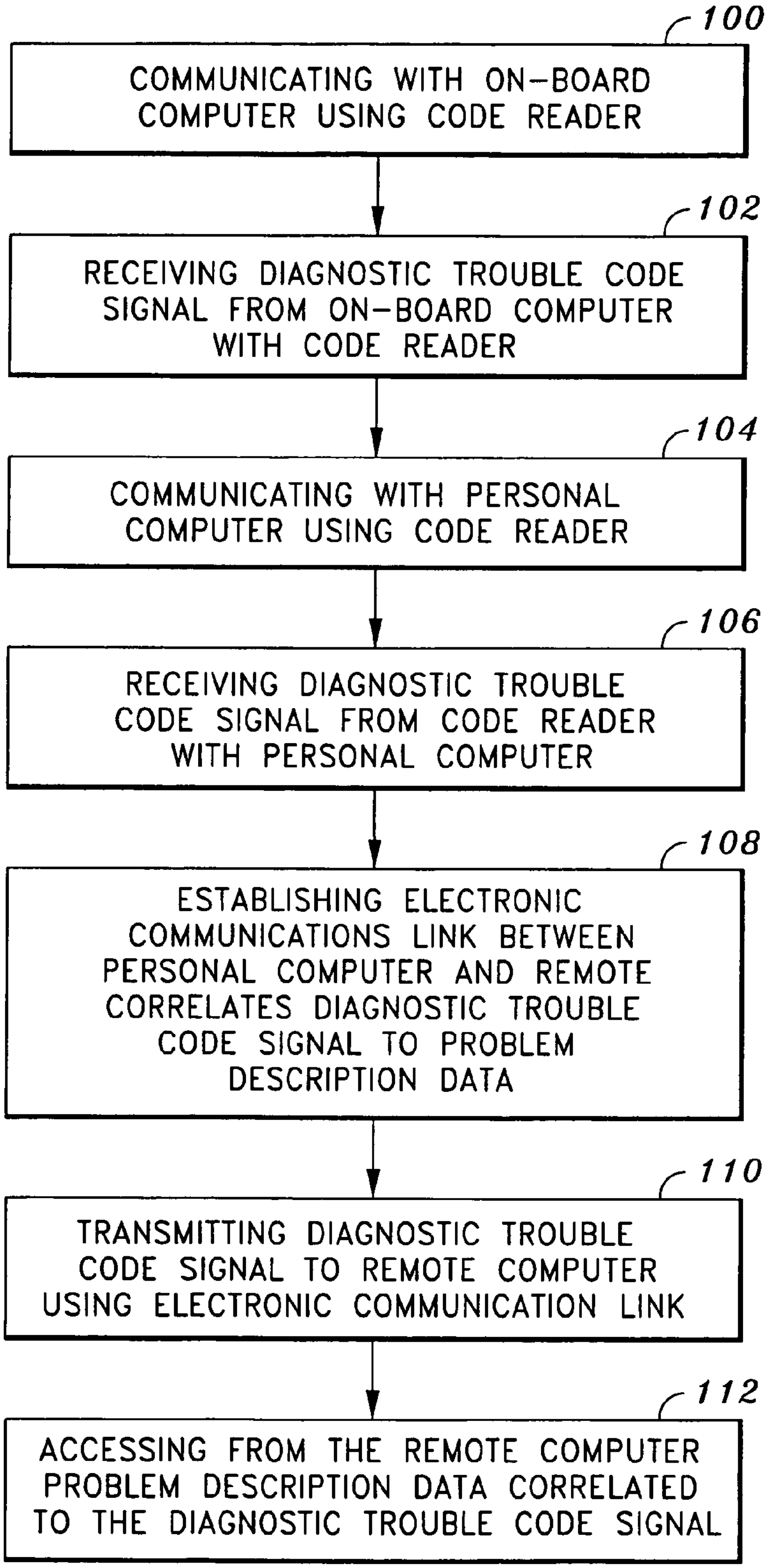
FIG. 3 is flow chart of a method of diagnosing a vehicle from a perspective of a vehicle owner according to an aspect of the present invention.
Figure 4:
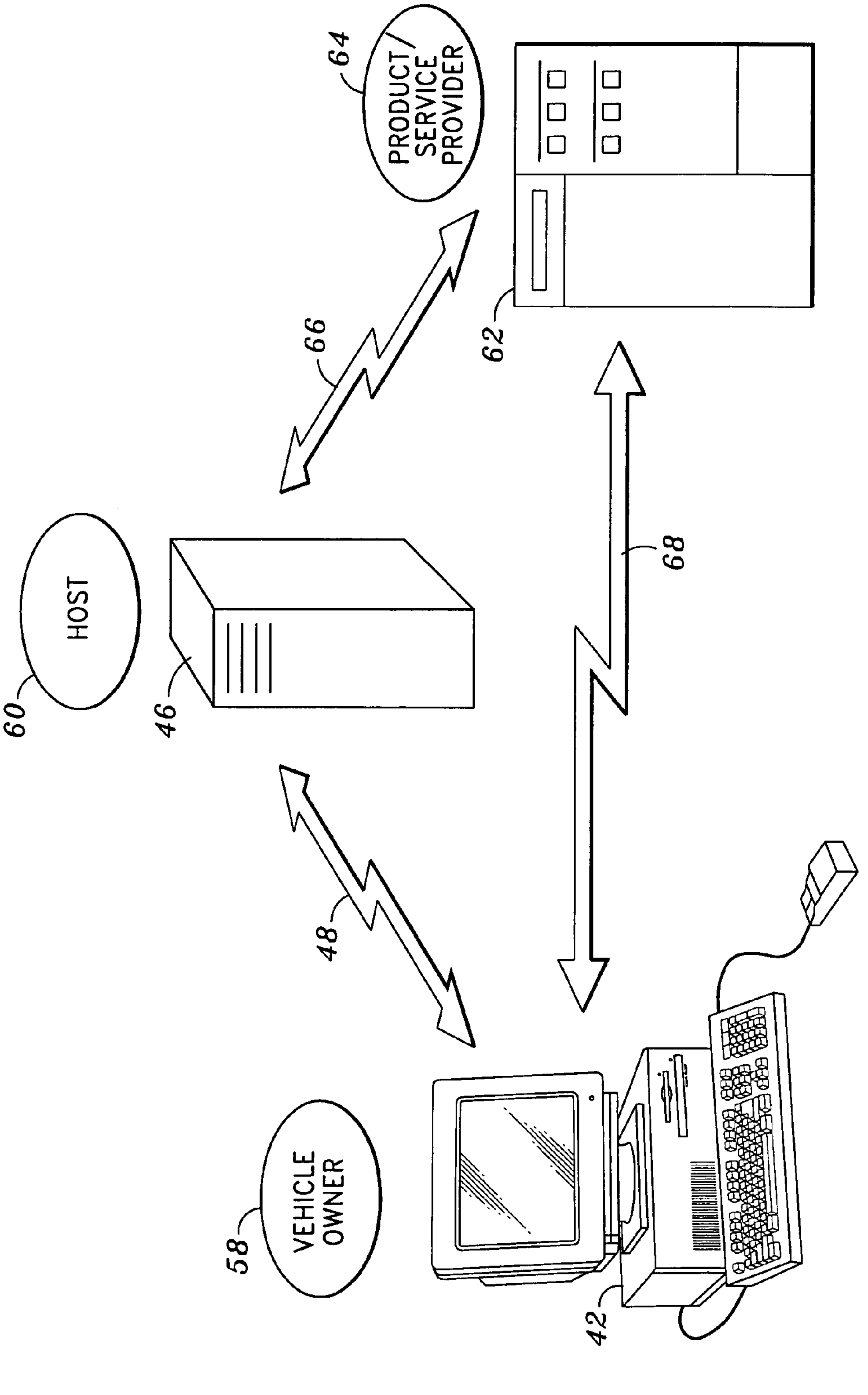
FIG. 4 is a symbolic relational diagram depicting the interactions between a personal computer of vehicle owner, remote computer of a host, and a product/service provider computer of a product/service provider according to another aspect of the present invention.
Figure 5:
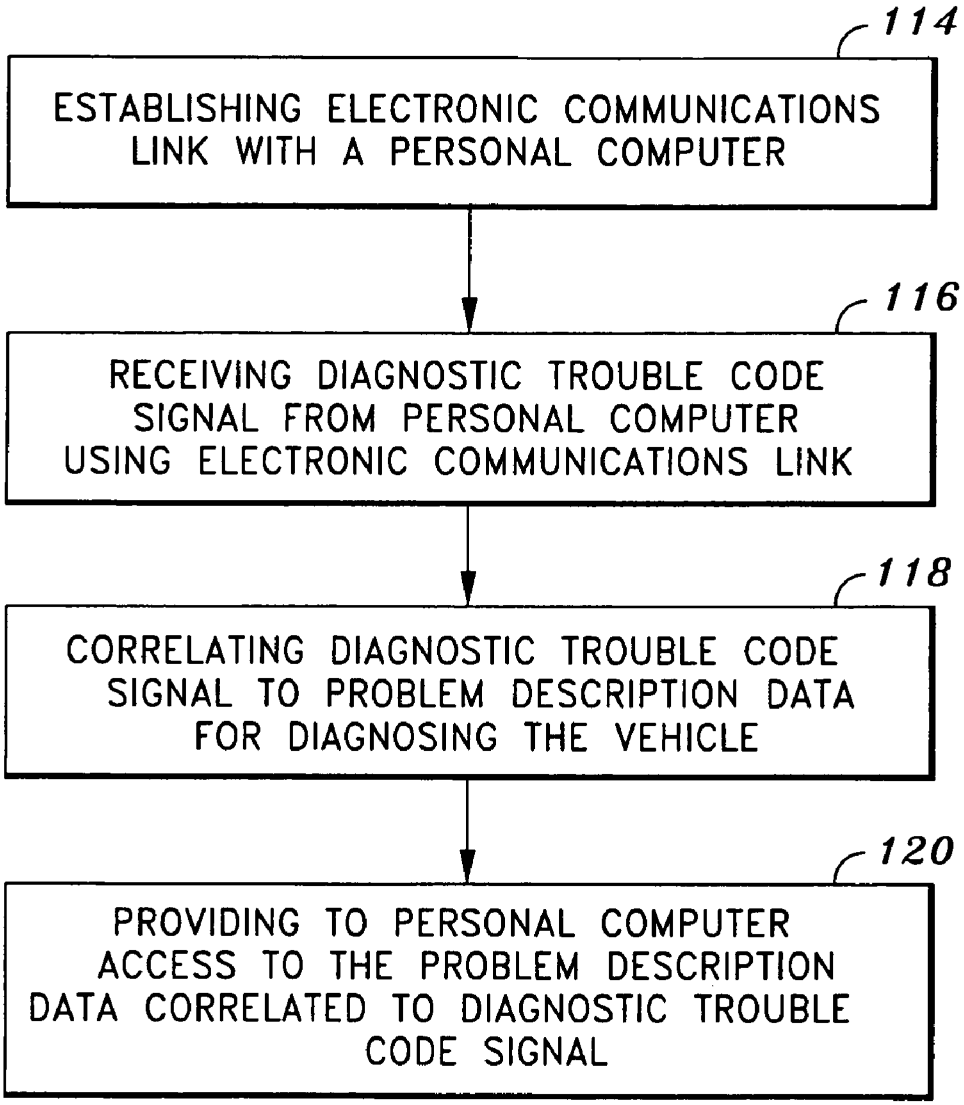
FIG. 5 is flow chart of a method of diagnosing a vehicle from a perspective of the host of the remote computer of FIG. 4.

Referring now additionally to FIGS. 3 and 4, there is provided a method of diagnosing the vehicle 10 according to an aspect of the present invention. FIG. 3 depicts a flowchart of steps included in the present method. Referring to FIG. 4, it is contemplated that the vehicle 10 may have a vehicle owner 58. In this regard, the term vehicle owner 58 broadly refers to a person or entity associated with the vehicle 10, and is not limited to application of ownership principles. In this context, the vehicle owner 10 may further have access to the personal computer 42. From the perspective of a vehicle owner 58, for example, there is provided the present method of diagnosing the vehicle 10.

The method begins with block 100 which includes connecting a portable code reader 14 to the on-board computer 12. As such, the portable code reader 14 is enabled to electronically communicate with the on-board computer. The on-board computer 12 and code reader 14 are as described above. Block 100 may include utilizing a cable connection for electronically communicating with the on-board computer 12 using the code reader 14. In this regard, the vehicle owner 58 may be provided with the code reader 14 which the vehicle owner 58 connects to the on-board computer 12 via the cable 20. The method continues with block 102 which includes communicating diagnostic trouble code signals from the on-board computer 12 to the code reader 14. The method continues with block 104 which includes communicating from the code reader 14 to the personal computer 42 respective ones of the diagnostic trouble code signals which are related to a problem status of the vehicle 10. The method continues with block 106 which includes communicating from the personal computer 42 to a remote computer 46 respective ones of the diagnostic trouble code signals which are related to a problem status of the vehicle 10. The remote computer 46 is configured to correlate the respective ones of the diagnostic trouble code signal to problem description data for diagnosing the vehicle 10. The method continues with block 108 which includes communicating problem description data correlated to the respective ones of the diagnostic trouble code signals from the remote computer to the personal computer 42. Block 108 may further include communicating product/service provider information related to the problem description data.

As shown in FIG. 4, the remote computer 46 has associated with it a host 60. In this regard, the host 60 may be an entity which is responsible for or otherwise associated with maintaining the remote computer 46. From the perspective of the host 60, for example, there is provided the another method of diagnosing the vehicle 10 according to another aspect of the present invention.

Figure 6:
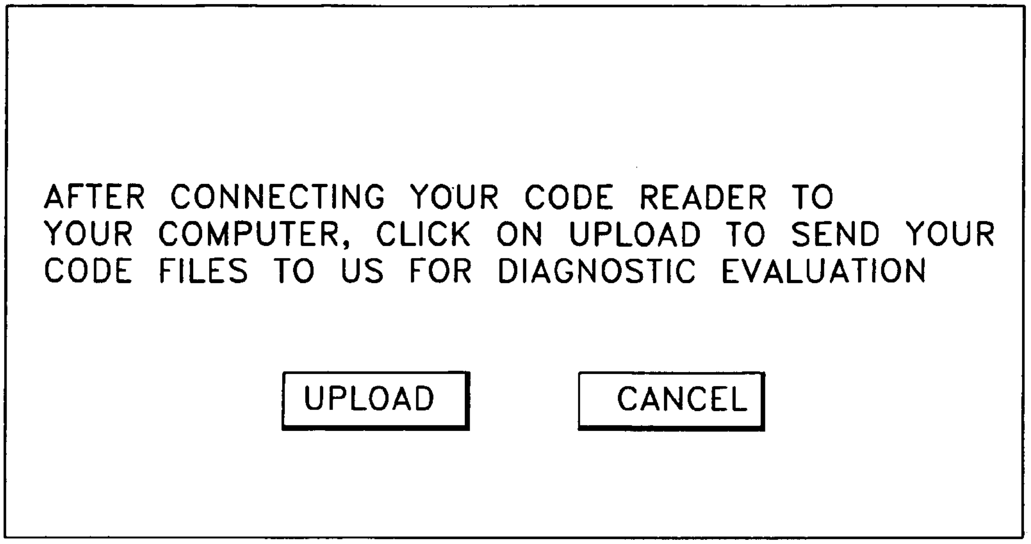
FIG. 6 is an exemplary screen display used by a remote computer for communication with the vehicle owner for receiving diagnostic trouble codes.
Figure 7:
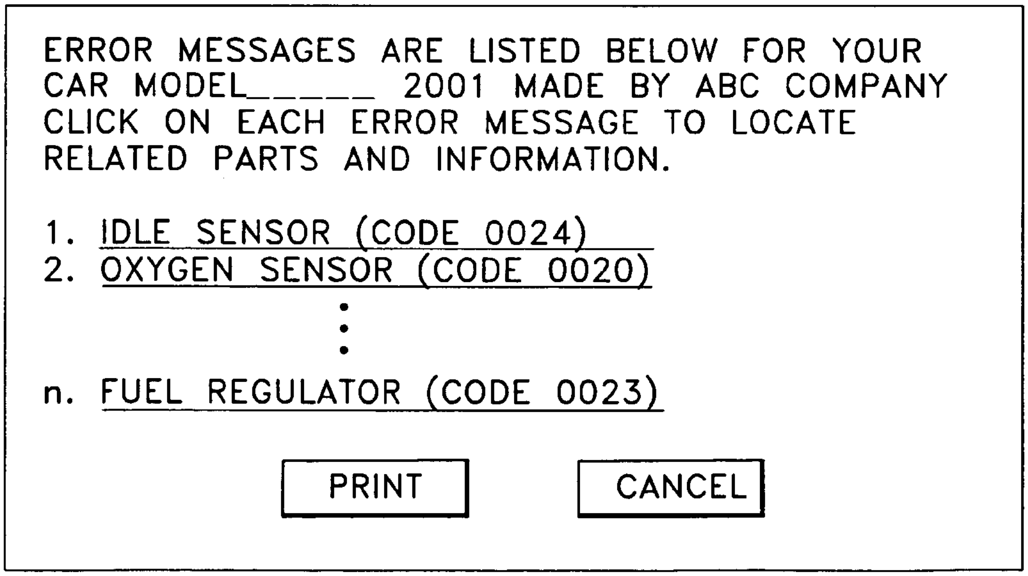
FIG. 7 is an exemplary screen display used by a remote computer for communication with the vehicle owner for providing the vehicle owner with product/service provider information related to the diagnostic trouble codes.

The method begins with block 110 which includes receiving the diagnostic trouble code signals from the personal computer 42 by a remote computer 46. In this regard, the vehicle owner 58 may be presented with a graphic user interface such as shown in FIG. 6 which may be used to initiate transmission from the personal computer 42 and subsequent receipt by the remote computer 46 of the diagnostic trouble code signals.

The method continues with block 112 which includes correlating the diagnostic trouble code signal to problem description data for diagnosing the vehicle 10. Block 112 may include hosting a database, such as problem description data 54, having problem description data for diagnosing the vehicle 10 indexed to diagnostic trouble codes. The method continue with block 114 which includes communicating to the personal computer 42 from the remote computer 46 the problem description data correlated to the diagnostic trouble code signal. Block 114 may further include communicating to the personal computer 42 product/service provider information related to the problem description data. Block 114 may further continue with facilitating a vehicle owner/provider electronic communications link 68 between the personal computer 42 and a product/service provider computer 62. For example, referring to FIG. 7, there is depicted an exemplary depict of a graphical user interface that may be presented to the vehicle owner 58 by the remote computer 46. By "clicking" on the displayed error messages, a hypertext link may be initiated for link to the product/service information which may be hosted by the remote computer 46 or by the product/service provider computer 62 as accessed via the remote computer 46.

It is contemplated that a product/service provider 64 may have associated with it the product/service provider computer 62. The host 60, via the remote computer 46, may establish a host/provider electronic communications link 66 with the product/service provider computer 62 of the product/service provider 64. As used herein, the term product/service provider 64 refers to an entity having associated with it a product or service (generically referred to herein as product/service) for offering to a vehicle owner 58. For example, a product/service may be a particular replacement part, such as a muffler or brake pads, which may be associated with the problem description data. In this regard, the term vehicle owner 58 further includes not only those entities that transact business with the product/service provider 64 concerning the product/service, but also those that may potentially transact business with the product/service provider 64 or are targeted as such by the product/service provider 64.

As such the product/service provider information related to the problem description data, may take the form of information related to products/services (e.g., specific replacement parts or tools associated with affecting repairs to diagnostic trouble codes, such as part numbers, availability, and pricing) and/or information regarding the product/service providers 64 offering for sale such products/services. Such product/service provider information may take the form of electronic links 56 which may allow access to provider computers 62. As such, from the perspective of the product/service provider 64, the host 60 serves the purpose of driving online "traffic" to the product/service provider computer 62, such as a web site of the product/service provider 64.

As used herein, the terms vehicle owner 58, personal computer 42, product/service provider 64 and product/service provider computer 62 include both the singular and the plural. In this regard, it is contemplated that the host 60 would routinely establish electronic communications links 48 with many personal computers 42 of different vehicle owners 58. Likewise, the host 60 could establish links 66 with a variety of product/service provider computers 62 of a variety of product/service providers 64.

It is contemplated that the product/service provider 64 may functionally be the host 60. It is contemplated that the host 60 and the product/service provider 64 may be the same entity, and the remote computer 46 and the product/service provider computer 62 may be the same device. In this regard, the host/provider electronic communications link 66 may be an internal process.

In addition, the method may further include establishing a financial relationship between a host 60 and the product/service provider 64. The relationship may provide that the product/service provider 64 owes consideration to the host 60 based upon the a number of times the vehicle owner/provider electronic communications link 68 is established (i.e., a "click through" count). Such click through count may be calculated and monitored by the remote computer 46. As such, block 120 may further include tracking a number of times the vehicle owner/provider electronic communications link 68 is established. Further, in an alternate or hybrid arrangement, the product/service provider 64 may owe consideration to the host 60 based upon sales transactions of the product/service to the vehicle owner 58 by the product/service provider 64.

In practice, once the electronic communications link 48 is established, vehicle owner/provider electronic communications link 68 between the personal computer 42 and a product/service provider computer 62 may be facilitated by the remote computer 46. In this regard, the remote computer 46 effectively redirects the contact with the personal computer 42 from itself to the product/service provider computer 52. Once the personal computer 42 is electronically linked with the product/service provider computer 52, the product/service provider 64 may then expose the vehicle owner 58 (e.g., a potential online customer) to its product/service information. As shown in FIG. 4, the vehicle owner/provider electronic communications link 68 is symbolic in nature, in that the vehicle owner/provider electronic communications link 68 may be effectuated indirectly through a combination of the electronic communications link 48 and the host/provider electronic communications link 66. For example, the vehicle owner/provider electronic communications link 68 may be established through a "framing" technique as implemented by the remote computer 46 which allows access by the personal computer 42 to the product/service provider computer 62 via host/provider electronic communications link 66 without having the personal computer 42 directly link to the product/service provider computer 62.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An automotive code reader for diagnosing a vehicle having an onboard computer for generating diagnostic trouble code signals, the diagnostic trouble code signals being related to a vehicle status, the tool comprising:

a connector for connecting to the onboard computer;

a connect button for electrically connecting the scan tool to the onboard computer;

a microprocessor disposed in the code reader, in electrical communication with the connector, for determining the presence of diagnostic trouble code signals as indicative of either a passed or problem status of the vehicle; and a plurality of indicator lights in electrical communication with the microprocessor, the microprocessor being operative to selectively illuminate a first indicator light in response to receipt of diagnostic trouble code signals from the onboard computer, a second indicator light in response to a determination that no diagnostic code signals were received from the onboard computer, and a third indicator light in response to an inability to conclusively determine presence or absence of diagnostic trouble code signals in the onboard computer;

the selective illumination of one of the indicator lights proceeding in response to operation of the connect button, independent of user interaction with a visual interface.

2. The code reader as recited in claim 1 wherein the selective illumination of an indicator light proceeds independent of resources external to the code reader.

3. The code reader as recited in claim 1 wherein the selective illumination of an indicator light proceeds independent of any vehicle specific identification by a user.

4. The code reader as recited in claim 1 wherein the selective illumination of an indicator light proceeds independent of any user selection of code reader controls.

5. The code reader as recited in claim 1 wherein the code reader further comprises a computer connection interface for communicating information from the microprocessor to a personal computer.

6. The code reader as recited in claim 1 where each of the visual indicia is representative of a different status of the vehicle.

7. An automotive code reader for diagnosing a vehicle having an onboard computer for generating diagnostic trouble code signals, the diagnostic trouble code signals being related to a vehicle status, the tool comprising:

a connector for connecting to the onboard computer;

a connect button for electrically connecting the scan tool to the onboard computer;

a microprocessor in electrical communication with the connector and operative to selectively generate a visual output signal representative of passed/failed/inconclusive status of the vehicle as determined from the absence/presence of diagnostic trouble code signals; and a plurality of indicator lights in electrical communication with the microprocessor, the microprocessor being operative to illuminate a first indicator light in response to receipt of diagnostic trouble code signals from the onboard computer, a second indicator light in response to a determination that no diagnostic trouble code signals were recorded in the onboard computer, and a third indicator light in response to an inability to conclusively determine presence or absence of diagnostic trouble code signals in the onboard computer;

the selective illumination of one of the indicator lights proceeding in response to operation of the connect button, independent of user interaction with a visual interface.

8. The code reader as recited in claim 7 wherein the selective illumination of an indicator light proceeds independent of resources external to the code reader.

9. The code reader as recited in claim 7 wherein the selective illumination of an indicator light proceeds independent of any vehicle specific identification by a user.

10. The code reader as recited in claim 7 wherein the selective illumination of an indicator light proceeds independent of any user selection of code reader controls by a user.

11. The code reader as recited in claim 7 wherein the code reader further comprises a computer connection interface for communicating information from the microprocessor to a personal computer.

* * * * *